July 3, 1956 L. EXLEY 2,752,784
APPARATUS FOR USE IN READING THE LEVEL OF LIQUIDS IN TANKS
Filed Sept. 24, 1952 5 Sheets-Sheet 1
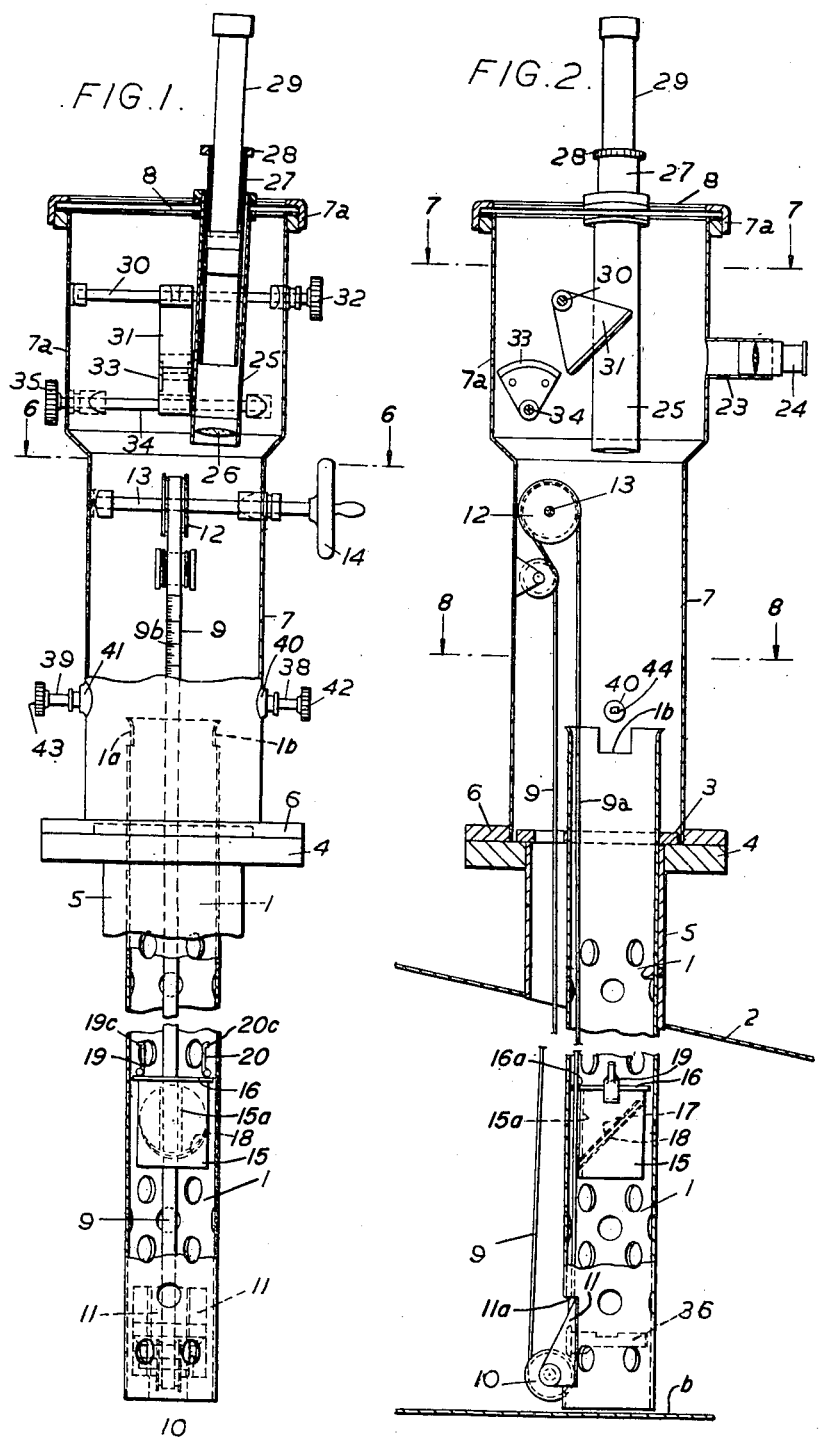
INVENTOR
LEONARD EXLEY
By
Attorney July 3, 1956      L. EXLEY      2,752,784

APPARATUS FOR USE IN READING THE LEVEL OF LIQUIDS IN TANKS

Filed Sept. 24, 1952      5 Sheets-Sheet 2

INVENTOR
LEONARD EXLEY

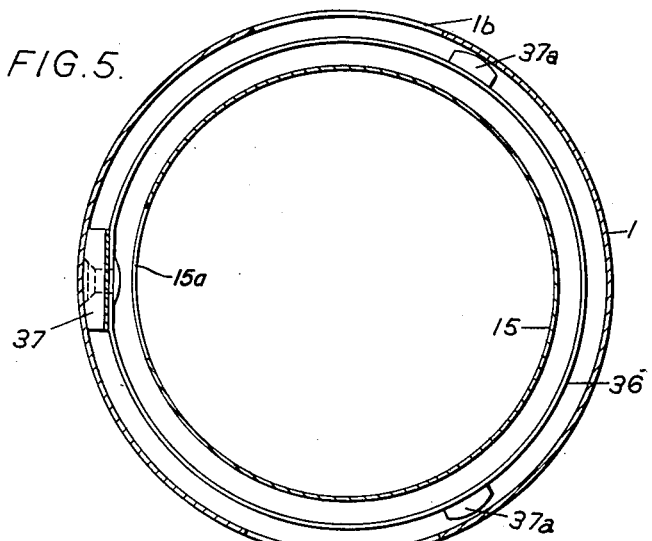
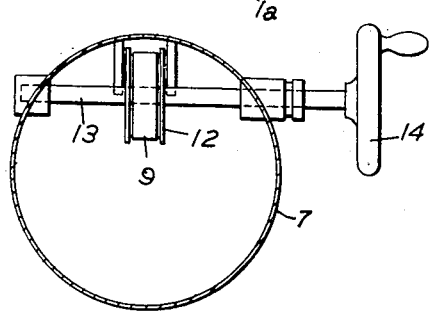
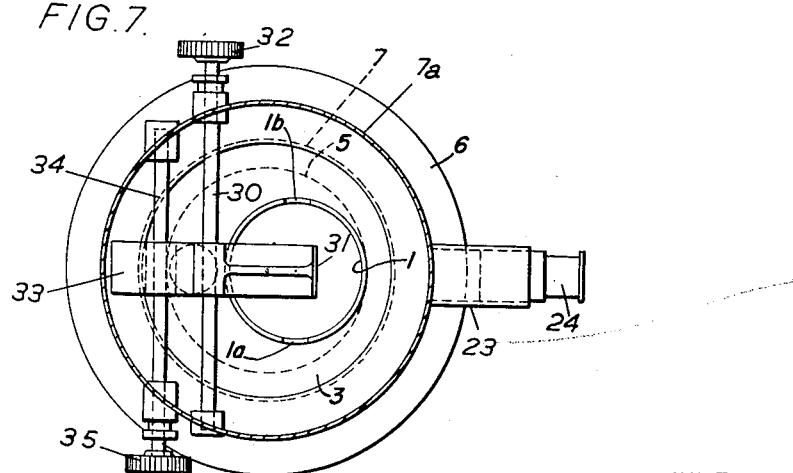

July 3, 1956 L. EXLEY 2,752,784
APPARATUS FOR USE IN READING THE LEVEL OF LIQUIDS IN TANKS
Filed Sept. 24, 1952 5 Sheets-Sheet 4
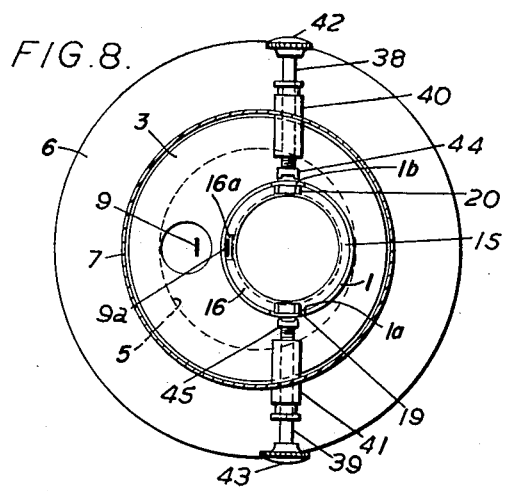
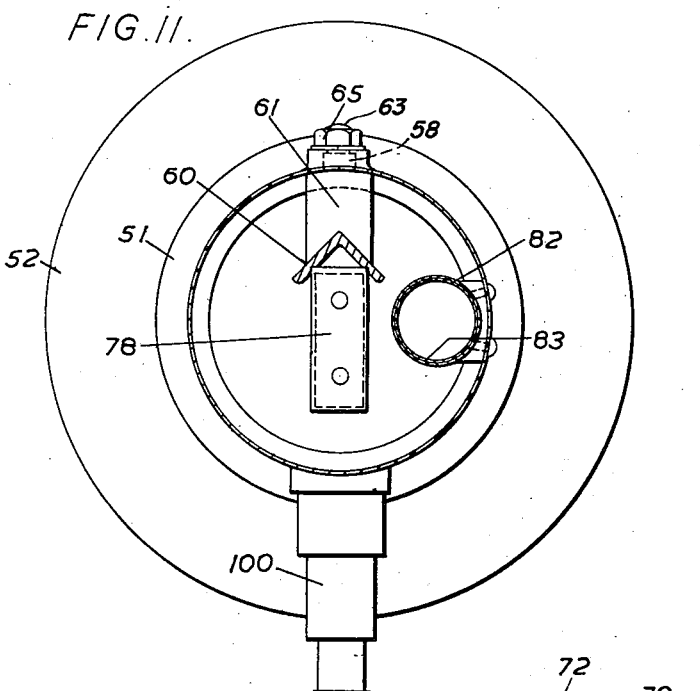
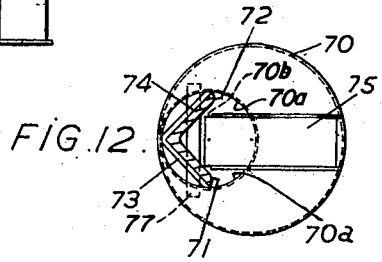
INVENTOR
LEONARD EXLEY July 3, 1956 L. EXLEY 2,752,784
APPARATUS FOR USE IN READING THE LEVEL OF LIQUIDS IN TANKS
Filed Sept. 24, 1952 5 Sheets-Sheet 5

INVENTOR
LEONARD EXLEY

United States Patent Office 2,752,784
Patented July 3, 1956

2,752,784

APPARATUS FOR USE IN READING THE LEVEL OF LIQUIDS IN TANKS

Leonard Exley, London, England

Application September 24, 1952, Serial No. 311,237

6 Claims. (Cl. 73—319)

This invention relates to apparatus for use in reading the level of liquid in tanks.

It is known that the usual method of reading the level of liquid in a tank by means of a dip-stick or a device in the form of a weighted line may be inaccurate, and also lead to a loss of vapour and that if the tank is of large capacity such inaccurate reading may be serious. It is the object of the present invention to provide apparatus which will overcome these disadvantages.

The invention is applicable to liquid-containing tanks of any volumetric capacity including large storage tanks. The invention is also applicable to tanks for storing water, volatile or non-volatile liquids and any other liquids or oils which are not too viscous.

The object of the invention is the provision of an improved apparatus by which a reading of the level of the liquid (volatile or non-volatile) within a tank may be conveniently obtained, and which is of such construction as to permit a scale to be adjusted within the tank without dismantling and disconnecting the apparatus therefrom in order to accommodate the scale to the interior of the tank and the volume of the contents therein and, further, as to permit the apparatus to be employed to obtain a sample of the contents or for other testing purposes—all of the mechanism being enclosed in a sealed housing and actuated exteriorly thereof to prevent the escape of vapor or gas should the liquid be of a volatile kind.

According to the present invention, the apparatus broadly comprises a closed housing supporting therein the mechanism and having an opening therein adapted to be coupled with an opening in or coaming on the tank, and through which openings a float-guide and a float member extend from the housing into the tank, the float being mounted to be guided by said guide with a free slidable movement therealong in accordance with changes of level of the liquid in the tank; a graduated scale associated with the float-guide and movably adjustable relative to said housing to nicely adjust the scale with respect to tanks of varying shapes and capacities with which the apparatus is employed to properly indicate the contents of the tank; lower reflecting means carried by the float, upper reflecting-means spaced above, and aligned with, the lower reflecting-means so that the graduation on the scale corresponding to the level of the liquid in the tank will be reflected from the lower reflecting-means on to the upper reflecting-means, and means through which the reflection of the said graduation on the upper reflecting-means can be observed from the outside of the apparatus.

The said float-guide may consist of a perforated dip-tube in which the float is slidable or it may consist of a bar whereon the float is slidably guided.

The upper reflecting means, which is arranged vertically above the lower reflecting-means, is arranged in a closed housing which may be supported upon a pipe arranged on top of the tank. The upper and/or the lower reflecting-means may consist of one mirror or one prism or any combination.

The said graduated scale may be fixed or movable relatively to the float-guide.

In the case of an apparatus which comprises a perforated dip-tube, the said graduated scale is conveniently provided on an endless tape which passes over an upper pulley which is turnably arranged in the said housing and a lower pulley which is turnably arranged in the dip-tube, one of the runs of the tape being arranged in the dip-tube and being provided with the said graduated scale, which latter faces a slot in the float. In such a construction means will be provided for rotating the upper pulley from the outside of the housing and means may also be provided for detachably-attaching the float to the endless tape so that the float may be lowered below the surface of the liquid in the tank.

Means, operable from the outside of the said housing, may be provided for cleaning the upper mirror and/or prism, and means may also be provided for projecting a spot-light on the reflecting-means carried by the float, the last mentioned means consisting either of an electric torch or a lamp connected to the mains associated with means for focussing the light upon the lower reflecting-means from which it is reflected upon the graduated scale.

As mentioned above, the said float-guide may be in the form of a bar which may be of angle section and longitudinally-adjustable, and the graduated scale may be provided on the angled surfaces of the bar directed towards a slot in the float.

Two constructional forms of the invention are shown, by way of example, in the accompanying drawings, in which:

Fig. 1 is a sectional elevation of a depth-gauge which is more particularly intended for permanent use on a large capacity tank;

Fig. 2 is a fragmentary elevation of the depth gauge at right angles to Fig. 1;

Fig. 3 is an elevation of the float when the latter is lifted and supported by the float lifting platform attached to the metal tape provided with graduations (indicating the depth of the liquid in the tank);

Fig. 4 is a view of the float at right angles to Fig. 3;

Fig. 5 is a section on the line 5—5 in Fig. 4;

Fig. 6 is a section on the line 6—6 in Fig. 1;

Fig. 7 is a section on the line 7—7 in Fig. 2;

Fig. 8 is a section on the line 8—8 in Fig. 2;

Fig. 11 is a section on the line 11—11 in Fig. 9; and

Fig. 12 is a section on the line 12—12 in Fig. 10.

Figure 9:
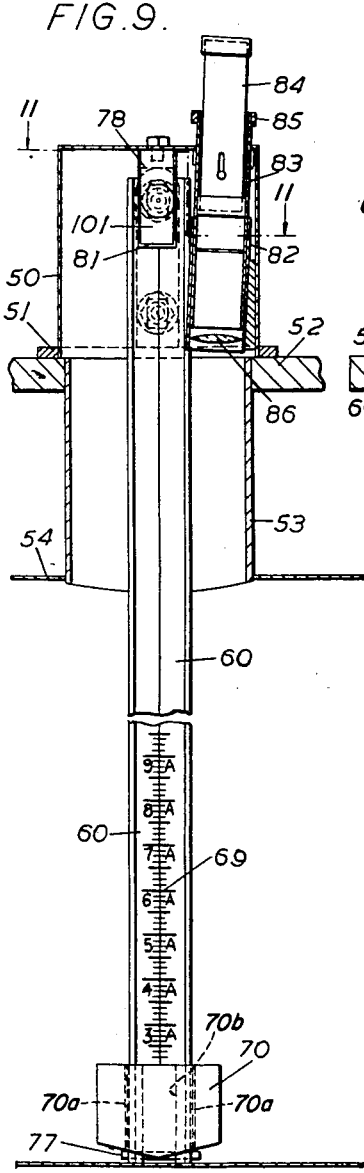
Fig. 9 is a sectional elevation of a modified portable depth-gauge in which the float is slidably guided upon an angular float-guide.
Figure 10:
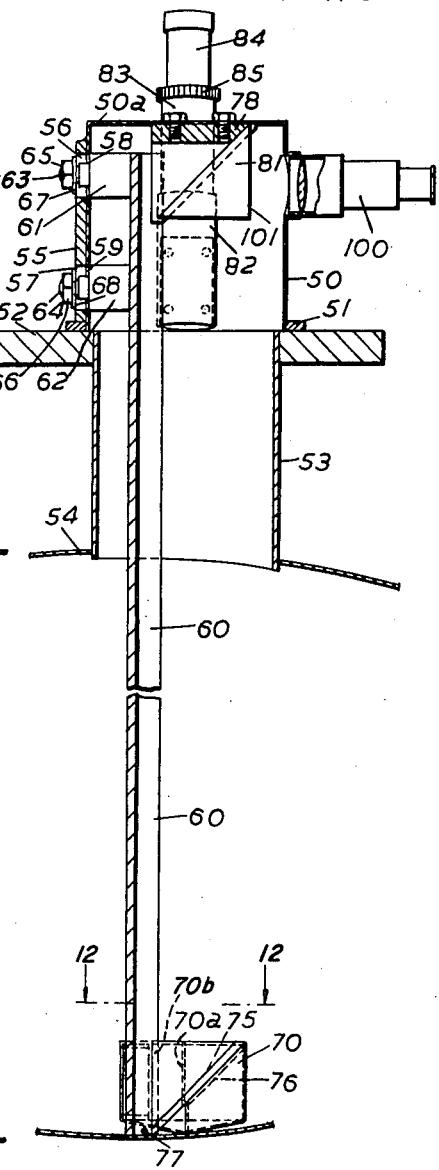
Fig. 10 is a sectional elevation of the same depth-gauge at right angles to Fig. 9.

Referring first to Figs. 1 to 8:

In this constructional form of the invention, a vertical perforated dip-tube 1 projects downwardly into the liquid tank 2 to such a depth that its lower end almost reaches the bottom $b$ of the tank. At its upper end the tube 1 is provided with a flange 3 which is secured to the flange 4 of a branch pipe 5 which projects upwards from the top of the tank, the axis of the tube 1 being offset to one side of the axis of the branch pipe, as shown in Fig. 2.

A flange 6 at the open lower end of a housing 7 is supported upon the flange 4 of the branch pipe or coaming 5, the open upper end of the housing being closed by a cover comprising a rim 7$a$ fitted with a glass panel 8. An endless metal tape 9 passes over a lower pulley 10 which is rotatably supported by brackets 11 upon the outside of the tube 1 close to its bottom end and one run 9$a$ of the tape projects through a slot 11$a$ in the tube into the interior of the latter. The tape also passes over an upper pulley 12 which is mounted upon a shaft 13 turnably supported in bearings provided on opposite sides of the housing 7 above the top of the tube 1. One end of the shaft 13 projects out of the housing and it is fitted with a hand-wheel 14 by which it may be turned. The two pulleys 10 and 12 are so arranged that the run 9a of the tape 9 is disposed within the tube 1 and this part of the run is provided with a scale of depth-indicating graduations 9b, as shown in Fig. 1, which may be vertically and nicely adjusted by movement of the run 9a of the tape 9 to the requirements of a particular tank with which it is employed.

Referring particularly to Figs. 3 and 4, a metal cup-like float 15, provided at its upper end with an external flange 16, is slidably arranged in the dip-tube 1 and a lower mirror or prism 17 is supported upon a diagonal partition 18 which is fixed within the float and slopes upwardly therein. The run 9a of the tape 9 is accommodated in a slot 16a formed in the flange 16 and a rectangular slot 15a is formed in the side wall of the float behind the run 9a so that the latter will be reflected upon the mirror or prism. On opposite sides of the float 15, two levers 19 and 20 are pivotally supported upon the flange 16. The lever 19 comprises an upper arm 19a and a lower arm 19b on opposite sides of the fulcrum and the lever 20 comprises an upper arm 20a and a lower arm 20b on opposite sides of its fulcrum. The upper lever arm 19a has an out-turned end 19c and the lower lever arm 19b an inturned end 19d. Similarly, the upper lever arm 20a has an out-turned end 20c and the lower lever arm has an in-turned end 20d. The levers are acted upon respectively by springs 21 and 22 which normally thrust the inturned ends 19d and 20d of the lower arms inwards, the levers then being substantially vertical.

A socket 23, Figs. 2 and 7, is provided on one side of the upper part 7a of the housing 7 and is adapted to hold the end of a telescope or adjustable magnifying eye piece 24, and one or more lenses arranged in front of the telescope or eye piece.

As shown in Figs. 1 and 2, in case it may be necessary to illuminate the graduated scale 9b on the tape 9 at the level of the float mirror or prism 17, a tube 25, fitted with one or more lenses 26 may be fitted on to the plate glass cover 8. Within the tube 25 there is an axially-adjustable tube 27 having a knurled adjustment collar 28 and at the upper end of which a torch or electric lamp 29 may be detachably fitted. The arrangement allows a focussed spot-light to be projected on to the mirror or prism 17 from which it is reflected on to the scale 9b through the slot 15a.

A shaft 30 is turnably arranged in bearings provided at opposite sides of the upper part 7a of the housing 7 and a mirror or prism 31 is fixed centrally upon the shaft so that when the shaft is in its normal position the centre of the mirror or prism is in vertical alignment with the centre of the mirror or prism 17 carried in the float 15. One end of the shaft 30 projects out of the housing and is fitted with an operating knob or handle 32.

As shown in Fig. 2, the axis of the telescope or eye piece 24 cuts the plane of the upper mirror or prism 31. The telescope or eye piece facilitates reading the graduated scale 9a reflected from the lower mirror or prism 17 on to the upper mirror or prism 31.

It will be appreciated that the float 15 is so designed that its lower part is always submerged in the liquid. The float will rise or fall in the dip-tube 1 in accordance with the rise or fall of the level of the liquid in the tank. When the apparatus is to be used, if it is necessary to illuminate the graduated scale 9a by artificial light, the electric torch or lamp 29 is switched on and the light from the torch or lamp illuminates the lower mirror or prism which reflects light on to the scale. Since the level of the surface of the liquid in the dip-tube 1 cuts the lower mirror or prism 17 in the float 15 at the same level of the part of the graduated tape 9 in the tube the graduation on the scale 9a cut by the surface of the liquid is reflected on to the upper mirror or prism 31 and thus can be read by means of the telescope or eye piece and magnifying lens 24.

Provision may be made for cleaning the upper mirror or prism 31 should the latter become fogged. Such means may take the form of a cleaner or rubber member 33 fixed upon a shaft 34 turnably mounted in the upper part 7a of the housing 7 and fitted with a knob 35. By turning the shaft 34 and the shaft 30 upon which the upper mirror or prism 31 is carried the surface of the mirror or prism can be rubbed over as and when required.

Means may be provided for detachably attaching the float 15 to the tape 9 so as to enable the float to be lowered to any desired level in the liquid and lifted again. As shown in Figs. 2 to 5, such means may comprise an annular flight member 36 which is fixed to the run 9a of the tape within the dip-tube 1 and is dimensioned and positioned to embrace or encircle the float 15 below the flange 16 at the upper end of the latter when the run 9a of the tape 9 is moved upwardly and, thus, acts as a platform by which the float 15 may be raised from the liquid within the tank 2 or lowered thereto. A rubbing pad 37 is also fixed to the surface of the tape opposite the flight member 36 and bears against the inner wall of the tube 1 and guides 37a are fixed to the platform or flight member 36 at spaced distances from the pad 37 and also bear against the inner wall to maintain the flight member concentric with the tube 1 to register with float 15. In normal conditions, the platform 36 is disposed at the bottom of the dip-tube, the arrangement being such that when the upper pulley 12 is turned in one direction, the platform 36 is moved upwards with the run 9a of the tape and eventually encircles the float 15 and engages under inturned ends 19d and 20d, Figs. 3 and 4, of the two levers 19 and 20, thus moving the float upwardly in the dip-tube 1. Two horizontal operating screws 38 and 39, Fig. 8, are turnably arranged in threaded holes formed in bosses 40 and 41 on opposite sides of the housing 7. The screws are respectively provided with knobs 42 and 43 externally of the housing and with heads 44 and 45 within the housing. The common axis of the two screws is in alignment with the central plane of the levers 19 and 20 on the float 15.

Thus, as shown in Figs. 3, 4 and 8, when the float has been lifted out of the dip-tube and into the housing 7, the float may be viewed or may be removed from the housing 7 through a door, not shown; or when in position, as shown, so that the screws 38 and 39 are opposite to the upper arms 19a and 20a of the levers 19 and 20 and the lower arms 19b and 20b opposite to slots 1a and 1b in the tube, the screws can be screwed inwards against the said arms under out-turned ends 19c and 20c. The upper arms are thus forced inwards and the lower arms 19b and 20b are forced outwards against the action of the springs 21 and 22 and the float is held against downward movement by the two screws. Then, by turning the upper pulley 12 in a direction to lift the float-platform 36 through a further short distance, the platform engages under the float flange 16 and holds the float in elevated position within the housing 7; and then by turning screws 38 and 39 back to their initial positions out of contact with the upper arms 19a and 20a of the levers 19 and 20, the inturned ends 19d and 20d engage under the platform 36, as can be clearly comprehended from Fig. 3. As the float is now gripped by the latch parts 19d and 20d, it may be lowered to any depth below the level of the liquid when the tape 9 is correspondingly moved by the hand wheel or crank 14.

In order to detach the float from the tape, the float is raised to the position in which the screws 38 and 39 are opposite to the upper arms 19a and 20a of the levers 19 and 20 as above described and shown in Fig. 3. The screws are turned inwards, so as to force the said arms inwardly and the lower arms 19b and 20b outwardly. Then, by turning the upper pulley 12 in the opposite direction, the platform 36 is lowered a short distance until clear of the inturned ends 19d and 20d of the levers. The screws are then turned backwards so as to allow the levers to resume their initial positions, whereupon the float drops on to the platform and may be removed, while containing a sample, through a door, not shown, in the housing 7; or can be taken down to liquid level by turning the pulley 12. By the continued turning of the pulley the platform or flight 36 is again brought into its initial position near to the bottom of the tube 1.

Figs. 9 to 12 illustrate a portable form of depth-gauge particularly for use with small capacity tanks. This construction does not comprise a dip tube. It includes a housing 50 provided with a flange 51 by which the gauge is supported upon a flange 52 provided at the top of a vertical branch 53 fixed to the top of the tank 54. A pad 55 fixed externally to one side of the housing 50 is formed with two vertically-spaced and vertically elongated slots 56 and 57 which are opposite to similar slots 58 and 59 formed in the housing.

A float-guide 60 in the form of an angle bar is provided at its upper end with two vertically-spaced blocks 61 and 62 which are reduced in diameter at their outer ends to provide studs 63 and 64. The studs are threaded at their outer ends and project through the aligned slots 56, 58 and 57, 59. Thus, the vertical position of the float-guide 60 can be varied and it can be fixed in its various adjusted positions by means of nuts 65 and 66 threaded upon the studs and bearing against washers 67 and 68 which are arranged between the nuts and the pad 55. As shown in Fig. 9, the graduations 69 indicating the depth of the liquid in the tank are provided on the inner faces of the flanges of the float guide and these graduations may be nicely adjusted with respect to the capacity or requirements of a particular tank 54 with which the guide 60 and float 70 are used by means of studs 63 and 64 in slots 56 and 57 just described. The float consists of a hollow vessel 70 which is closed at the top and bottom and has a rectangular slot 70b in its side wall facing the graduated scale. The float is provided with a tube 70a which embraces the flanges of the float guide and thus guides the float for upward and downward movement along the guide 60. Angled guide plates 73 and 74, Fig. 12, are fixed in the tube 70a and bear against the outer surface of the guide 60 to prevent the float turning. An upwardly-inclined mirror or prism 75 is fixed in the float on a support 76 and is so disposed that the graduations 69 are reflected onto it so that they can be read from above the float. Downward movement of the float on the float guide 60 is limited by a pin 77 which is fixed in, and near to, the bottom end of the float guide.

A bracket or casing 78 of triangular form is fixed to the inside of the top wall 50a of the housing 50 and fixed on to the sloping side of the bracket or casing there is a prism 81 which is arranged directly above the lower mirror or prism 75. The prism 81 can be replaced by an inclined mirror. A telescope or magnifying eye piece 100 is fixed to the casing 50 and is directed towards the vertical face 101 of the prism 81.

A spot-light focussing tube 82 is fixed at the bottom of the casing 50 to one side of the float-guide 60, as shown in Fig. 9, the upper end of the tube being internally-threaded to receive an externally-threaded lamp or torch holder 83 having a socket for the electric lamp or torch 84. The holder 83 projects out of the top 50a of the housing 50 and it is provided with a knurled collar 85 by means of which the holder may be axially adjusted. One or more lenses 86 are provided in the focussing tube 82 below the holder 83. The axis of the holder is disposed at such an angle that the spot-light is directed upon the lower mirror or prism 75 by which it is reflected on to the graduations 69.

A number of interchangeable float-guides provided with graduations representing different depths of liquid may be used.

In another form of the invention, use is again made of the dip-tube but the upper tape-winding pulley and the said float release device if used, are arranged in a much shorter housing. Further, the upper mirror or prism and the mirror-cleaning device, if used, are arranged in a portable casing to which the telescope or eye piece may be permanently or detachably attached.

The graduated endless tape may be replaced by a scale which is fixed longitudinally in the inside of the dip-tube or is etched or otherwise formed thereon.

As mentioned above, the upper and lower reflecting means may either consist of mirrors or prisms or combinations of mirrors and prisms.

Thus, the upper reflecting mirror may be replaced by a prism arranged with its hypotenuse in the place previously occupied by the mirror.

As an alternative, the upper reflecting means could still consist of an inclined mirror but the lower mirror could be replaced by a prism arranged in the float with its hypotenuse directed downwards and inclined to the surface of the liquid in the tank.

What I claim is:

1. In a tank gauge or the like, a closed housing having an opening provided with means for coupling the same with an open portion of a storage tank, gauging means within said housing and having portions thereof including a float-guide depending therefrom to extend substantially vertically into the liquid within the tank, a float mounted for free slidable movement along said float-guide, a graduated scale associated with and disposed along the length of said float-guide, means for moving said scale vertically relative to said housing and said tank to adjust the same in said tank and including an operating part exteriorly of said housing whereby said scale may be properly positioned in tanks of varying shapes and capacities within the limits of said adjustment, a reflecting-means carried by the float and positioned to reflect upwardly a portion of said scale that lies opposite said scale, a second reflecting-means within the upper end portion of said housing aligned with said other reflecting-means on said float and angled to reflect the image outwardly of said housing, and a magnifying eye-piece carried by the upper portion of said housing aligned with said second reflecting-means whereby the gauge reading is observed exteriorly of the housing.

2. A level indicating, testing and sampling device for liquid storage tanks comprising a housing adapted to be coupled with an open portion of a storage tank, gauging means within the housing and having portions thereof including a float-guide depending therefrom and adapted to extend into the tank, an open hollow float member mounted for slidable movement along said float-guide, an endless tape trained over a guide-support at the lower end of said float-guide and over a guide-support within said housing and normally disconnected from said float, means for rotating said last mentioned guide-support, one reach of said endless tape being disposed adjacent one side of said float coextensively with the movement of said float and having a graduated scale on the surface thereof opposite said float, reflecting means on said float arranged to receive images from said scale according to the position of the float with respect to the tape, means in the upper portion of the housing to receive the reflected image from said first reflecting means, a flight member carried by the tape and positioned to engage and lift the float upwardly along said float-guide when the tape is moved in one direction, cooperating latching means on the float and said flight whereby said float may be lowered into the liquid within the tank to any desired depth upon reverse movement of said tape and to permit the removal of the float from said flight when again raised into the housing.

3. The subject matter of claim 2 wherein the latching means comprises two levers pivotally mounted on opposite sides of the float and normally biased to latching position, each lever including a latching arm, latch operating means positioned in the housing to engage said levers, when the same are positioned opposite said latch operating means, whereby the latching arms permit the cooperating means on the flight to move into or out of position for engagement and disengagement therewith.

4. The subject matter of claim 3 wherein said latch operating means has manually actuatable elements exterior of the housing.

5. Apparatus as claimed in claim 2, wherein the said latching means comprises two levers which are pivotally mounted on opposite sides of a flange provided at the top of the float, each lever comprising an upper arm and a lower arm respectively above and below its fulcrum, and latch operating means which, when brought into an operative position, causes the upper lever arms to move inwards and the lower lever arms to move outwards, the arrangement being such that when the inner run of the tape is moved upwards the said flight member engages under the said lower arms and the float may be lifted into a position in which the bringing of the said latch operating means into the operative position will cause the said latch operating means to engage with the upper lever arms and thus to support the float in its raised position, while the continued movement of the tape in the same direction will cause said flight member to engage under the said flange, whereas when the said latch operating means is moved into the inoperative position the upper lever arms are released and swing outwards and the lower lever arms swing inwards and engage under said flight member and the float is thus engaged with the tape and can be lowered to any required depth in the liquid when the tape is moved in the opposite direction.

6. Apparatus as claimed in claim 5, wherein the said operating means consist of two diametrically-opposite screws which are turnably supported in the said housing, and wherein the said levers are spring-urged to cause the lower lever arms normally to swing inwards towards the float.

References Cited in the file of this patent

UNITED STATES PATENTS

| | | |
|---|---|---|
| 2,102,615 | Cubete | Dec. 21, 1937 |
| 2,466,437 | Jurs | Apr. 5, 1949 |

FOREIGN PATENTS

| | | |
|---|---|---|
| 503,881 | France | Sept. 15, 1919 |
| 303,474 | Italy | Dec. 3, 1932 |